(12) United States Patent
Renard et al.

(10) Patent No.: US 11,256,601 B2
(45) Date of Patent: Feb. 22, 2022

(54) METHOD AND DEVICE FOR MONITORING SOFTWARE APPLICATION(S) WITH A BUFFER TIME PERIOD PRECEDING A SECTION RESERVED FOR A SET OF SHARED RESOURCE(S), RELATED COMPUTER PROGRAM AND AVIONICS SYSTEM

(71) Applicant: THALES, Courbevoie (FR)

(72) Inventors: Benoit Renard, Marcheprime (FR); Kevin Le Bihan, Le Haillan (FR)

(73) Assignee: THALES, Courbevoie (FR)

( * ) Notice: Subject to any disclaimer, the term of this patent is extended or adjusted under 35 U.S.C. 154(b) by 280 days.

(21) Appl. No.: 16/694,802

(22) Filed: Nov. 25, 2019

(65) Prior Publication Data

US 2020/0174906 A1 Jun. 4, 2020

(30) Foreign Application Priority Data

Nov. 30, 2018 (FR) ..................................... 18 72148

(51) Int. Cl.
  *G06F 11/34* (2006.01)
  *B64F 5/60* (2017.01)
  *G06F 11/30* (2006.01)

(52) U.S. Cl.
  CPC ............ *G06F 11/3495* (2013.01); *B64F 5/60* (2017.01); *G06F 11/302* (2013.01); *G06F 11/3013* (2013.01)

(58) Field of Classification Search
  None
  See application file for complete search history.

(56) References Cited

U.S. PATENT DOCUMENTS

| | | | |
|---|---|---|---|
| 8,977,795 B1 * | 3/2015 | Mater ....................... | G06F 9/52 710/240 |
| 9,306,894 B1 * | 4/2016 | Anderson ............... | H04L 51/24 |
| 10,664,325 B1 * | 5/2020 | Radack .................. | G06F 9/524 |

(Continued)

OTHER PUBLICATIONS

French Search Report issued by the the French Patent Office corresponding to French Application No. 1872148, dated Oct. 16, 2019.

(Continued)

*Primary Examiner* — Qing Chen
(74) *Attorney, Agent, or Firm* — Arent Fox LLP

(57) ABSTRACT

A method for monitoring at least one software application able to be executed on a platform including resources that each software application is able to access during its execution, is implemented by an electronic monitoring device. It comprises:

monitoring each access request sent by a non-critical software application in order to access a set of resource(s) shared between the non-critical software application and at least one critical software application; and putting the access request sent by the non-critical software application on hold if it is sent during a buffer time period preceding the execution of the next critical software application including a reserved section for the set of shared resource(s), the reserved section being a time period during which one of the at least one critical software application requests exclusive access to the set of shared resource(s).

14 Claims, 6 Drawing Sheets

(56) References Cited

U.S. PATENT DOCUMENTS

| | | | |
|---|---|---|---|
| 2002/0007408 A1* | 1/2002 | Kalhour | G06F 9/526 |
| | | | 709/225 |
| 2007/0078891 A1* | 4/2007 | Lescouet | G06F 9/4881 |
| 2010/0186013 A1* | 7/2010 | Harrop | G06F 9/524 |
| | | | 718/100 |
| 2010/0211682 A1 | 8/2010 | Capomassi et al. | |
| 2011/0055841 A1* | 3/2011 | Senno | G06F 9/52 |
| | | | 718/103 |
| 2013/0019248 A1* | 1/2013 | Yu | G06F 9/52 |
| | | | 718/104 |
| 2014/0026143 A1* | 1/2014 | Suzuki | G06F 9/52 |
| | | | 718/104 |
| 2015/0089060 A1* | 3/2015 | Cruz-Aguilar | H04L 67/104 |
| | | | 709/225 |
| 2019/0042314 A1* | 2/2019 | Verrall | G06F 9/4881 |
| 2020/0150960 A1* | 5/2020 | Williams | G06F 9/3834 |

OTHER PUBLICATIONS

Motruk, Boris et al., "IDAMC: A Many-Core Platform with Run-Time Monitoring for Mixed-Criticality", High-Assurance Systems Engineering (HASE), 2012 IEEE 14th International Symposium on, IEEE, pp. 24-31 (Oct. 25, 2012).

* cited by examiner

METHOD AND DEVICE FOR MONITORING SOFTWARE APPLICATION(S) WITH A BUFFER TIME PERIOD PRECEDING A SECTION RESERVED FOR A SET OF SHARED RESOURCE(S), RELATED COMPUTER PROGRAM AND AVIONICS SYSTEM

CROSS-REFERENCE TO RELATED APPLICATIONS

This application is a U.S. non-provisional application claiming the benefit of French Application No. 18 72148, filed on Nov. 30, 2018, which is incorporated herein by reference in its entirety.

FIELD

The present invention relates to a method for monitoring at least one software application able to be executed on a platform, the platform including resources that each software application is able to access during its execution, the method being implemented by an electronic monitoring device.

The invention also relates to a non-transitory computer-readable medium including a computer program including software instructions which, when executed by a computer, implement such a method.

The invention also relates to an electronic monitoring device for monitoring at least one software application able to be executed on a platform, the platform including resources that each software application is able to access during its execution.

The invention also relates to an electronic avionics system comprising a memory able to store at least one avionics software application; a platform able to execute each avionics software application, the platform including resources that each software application is able to access during its execution; and such an electronic monitoring device able to monitor each avionics software application.

BACKGROUND

The invention relates to the field of the qualification of computer platforms, in particular embedded platforms, in particular embedded avionics platforms. The invention then relates to the monitoring of the operation of software applications executed on such platforms, in particular for avionics platforms, for example with one or several multicore processors.

The invention more specifically relates to the field of critical systems, and the invention seeks to guarantee the proper operation of software applications, called critical software applications, having a major impact in terms of safety on the associated system, such as the electronic avionics system. These critical software applications, also called critical functions, must generally be executed in a given amount of time with a defined temporal allowance. Conversely, other software applications, called non-critical, have a low impact, or no impact, in terms of safety on the associated system, and their execution can then be at least partially offset over time without undermining the proper working of the associated system.

A difficulty then appears when several software applications are executed on a same platform, in particular via a same single-core or multicore processor, and in general when the resources of the platform are potentially usable at the same time by several software applications, and in several contexts, namely on the one hand in a context with a low impact, or no impact, in terms of safety, and on the other hand in a context with a high impact in terms of safety and with a strong execution deadline.

It is then known to avoid, by design, any sharing, at a given temporal execution moment, of resources of the platform between critical software application(s) and non-critical software application(s).

However, it is sometimes impossible to guarantee that such resource sharing will not occur, in particular with one or several multicore processors.

It is also known to provide temporal margins at the end of the execution of each software application, these margins including a maximum potential time shift, in order to prevent an execution delay of a non-critical software application from causing, in turn, a delay in the execution of the critical software application whose execution follows that of said non-critical software application.

However, with such temporal margins, the platform is underutilized.

SUMMARY

The aim of the invention is then to propose a method and a device for monitoring at least one software application able to be executed on a platform, which make it possible to offer a better operation of the platform, while guaranteeing a good execution of the software applications, in particular of the critical software applications generally having to be executed in a given time with a given temporal allowance.

To that end, the invention relates to a method for monitoring at least one software application able to be executed on a platform, the platform including resources that each software application is able to access during its execution, the method being implemented by an electronic monitoring device and comprising the following steps:
  monitoring each access request sent by a non-critical software application in order to access a set of resource(s) shared between said non-critical software application and at least one critical software application; and
  putting the access request sent by the non-critical software application on hold if said request is sent during a buffer time period preceding the execution of the next critical software application including a section reserved for said set of shared resource(s), the reserved section being a time period during which one of the at least one critical software application requests exclusive access to at least one of the resources of said set of shared resource(s).

With the monitoring method according to the invention, the putting of the access request sent by the non-critical software application on hold if said request is sent during the buffer time period preceding the execution of the next critical software application including a section reserved for said set of shared resource(s), makes it possible to prevent said non-critical software application from using the set of shared resource(s) if it cannot next free said set of shared resource(s) before the execution of the next critical software application including the next reserved section.

In other words, the monitoring of each access request sent by the non-critical software application in order to access the set of shared resource(s) between it and at least one critical software application and the aforementioned putting on hold, under conditions, of certain access request(s) sent by the non-critical software application, seeks to authorize the access of the non-critical software application to said set of shared resource(s) only when said set will next be released before a critical software application needs to access said set of shared resource(s).

According to other advantageous aspects of the invention, the monitoring method comprises one or more of the following features, considered alone or according to all technically possible combinations:

said access request sent by the non-critical software application is further put on hold if it is sent during the execution of the next critical software application including the section reserved for said set of shared resource(s);

the duration of the buffer time period depends on a worst-case execution time of each section reserved for said set of shared resource(s), the duration of the buffer time period preferably being equal to the worst case execution time of maximum duration among the worst case execution time(s) of the section(s) reserved for said set of shared resource(s), each worst case execution time preferably being calculated during a prior static analysis;

the set of shared resource(s) includes a plurality of shared resources, and the duration of the buffer time period is determined for said plurality of shared resources;

each shared resource is chosen from among the group consisting of: a core of a processor of the platform, a memory zone of the platform hosting a software object shared by several execution threads, a part of a peripheral of the platform;

the method further comprises the following step: sending the non-critical software application a signal informing it that its access request has been put on hold;

each critical software application has a criticality level corresponding to a DAL level defined according to standard DO-178 revision B and following revision(s), or according to standard ARP4754, the criticality level preferably being equal to level DAL A or to level DAL B, the levels DAL A and DAL B preferably still being considered the most critical; and each software application is an avionics software application, the platform being intended to be embedded in an aircraft.

The invention also relates to a non-transitory computer-readable medium including a computer program including software instructions which, when executed by a computer, implement a monitoring method as defined above.

The invention also relates to an electronic monitoring device for monitoring at least one software application able to be executed on a platform, the platform including resources that each software application is able to access during its execution, the electronic monitoring device comprising:

a monitoring module configured to monitor each access request sent by a non-critical software application in order to access a set of resource(s) shared between said non-critical software application and at least one critical software application; and a hold module configured to put the access request sent by the non-critical software application on hold if said request is sent during a buffer time period preceding the execution of the next critical software application including a section reserved for said set of shared resource(s), the reserved section being a time period during which one of the at least one critical software application requests exclusive access to at least one of the resources of said set of shared resource(s).

The invention also relates to an electronic avionics system comprising:

a memory able to store at least one avionics software application;

a platform able to execute each avionics software application, the platform including resources that each software application is able to access during its execution; and an electronic monitoring device for each avionics software application, the electronic monitoring device being as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
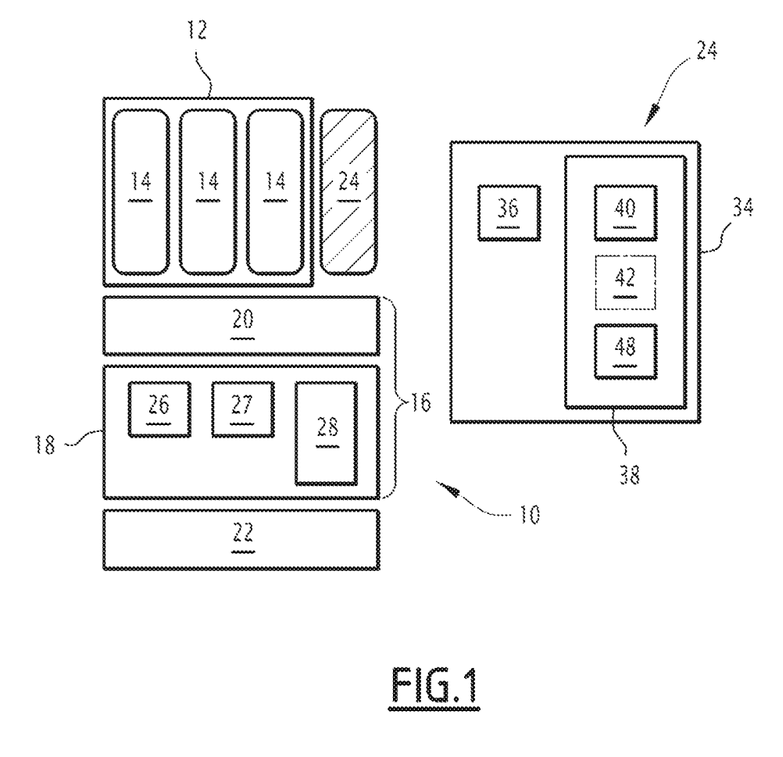
FIG. 1 is a schematic illustration of an electronic avionics system according to the invention, comprising a memory able to store at least one avionics software application, a platform able to execute each avionics software application, and an electronic monitoring device for each avionics software application, the platform including resources that each software application is able to access during its execution.

In FIG. 1, an electronic system 10, in particular an avionics electronic system intended to be on board an aircraft, comprises a memory 12 able to store software applications 14 and a platform 16 able to execute each software application 14 and the platform 16 including resources 18 that each software application 14 can access during its execution and hosting at least one operating system 20, the platform 16 being connected to other electronic systems 22 of the aircraft, such as other electronic avionics systems of the aircraft.

The electronic system 10 further comprises, according to the invention, an electronic device 24 for monitoring at least one software application 14.

In FIG. 1, to simplify the drawing, the memory 12 has been shown outside the rectangle symbolizing the resources 18, in order to provide a distinct illustration of the software layer corresponding to the software applications 14, as well as the monitoring device 24, if applicable. Nevertheless, one skilled in the art will of course understand that the memory 12 is included in the resources 18 of the platform 16.

The aircraft is preferably an airplane. Alternatively, the aircraft is a helicopter, or a drone piloted remotely by a pilot.

In the example of FIG. 1, the memory 12 is able to store three separate software applications 14, and the electronic monitoring device 24 is then configured to monitor each of these software applications 14.

Each software application 14 is intended to be executed by the platform 16, and is then designed to emit one or several calls to the operating system 20 hosted by the platform 16 and is also configured to use resources 18 of the platform 16.

When the electronic system 10 is an electronic avionics system on board the aircraft, each software application 14 is also called avionics function. The software applications 14 for example perform different functions to carry out a flight.

Among the software applications 14, some software applications are said to be critical, and are then denoted $14_C$, and other software applications are said to be non-critical and denoted $14_{NC}$.

One skilled in the art will then understand that reference 14 will designate a software application in general, whether it involves a critical application or not, and reference $14_C$ designates a critical software application specifically, while reference $14_{NC}$ designates a non-critical application specifically.

A critical software application $14_C$ refers to a software application having to be executed in a given amount of time with a defined temporal allowance. A critical software application $14_C$ generally has a major impact in terms of safety on the associated system, such as the avionics electronic system 10, and is for example an application concerning the braking system or the flight management system of the aircraft.

Conversely, a non-critical software application $14_{NC}$ refers to a software application whose execution can be at least partially offset in time without undermining the proper working of the associated system. Such a non-critical software application $14_{NC}$ then has a small impact, or even no impact, in terms of safety on the associated system, such as the avionics electronic system 10.

Each critical software application $14_C$ for example has a criticality level corresponding to a DAL level defined according to standard DO-178 revision B and following revision(s), or according to standard ARP4754.

According to this example, each critical software application $14_C$ then preferably has a criticality level equal to level DAL A or level DAL B, levels DAL A and DAL B being considered the most critical levels, and each non-critical software application $14_{NC}$ then has a criticality level equal to level DAL C, level DAL D or level DAL E, levels DAL C to DAL E then being considered the least critical.

In the example of a radar system, a critical software application $14_C$ will then for example relate to a mode calculation on data coming from sensors, the execution of such a calculation having to be done in a given amount of time with a predefined temporal allowance, and failing that, a delay in this mode calculation causing the absence of radar images, which is a strong operational impact. On the contrary, the display of a maintenance man/machine interface for the radar system is a non-critical software application $14_{NC}$, a delay in the display of maintenance data having a low impact, such a display of maintenance data not being necessary during a flight of the aircraft.

The platform 16 is in particular intended to be on board the aircraft. The platform 16 is for example an information processing unit made up of one or several memories associated with one or several processors, such as multicore processors.

The invention is applicable to different types of software architectures, in particular to a so-called symmetrical multiprocessing (SMP) architecture, or to an asymmetrical multiprocessing (AMP) architecture.

The resources 18 of the platform 16 are physical or logic elements capable of being provided to the software application(s) 14.

The resources 18 are for example distributed in the following categories:
 resources of the data processing type. Such resources for example include one or several processors, such as single-core processors or multicore processors each having several distinct cores;
 resources of the mass memory type;
 resources of the input and output types;
 resources specific to the avionics networks. Such resources are for example the communication routers of an ARINC 664 network; and
 resources of the graphic type, that is to say, resources allowing a display, such as a screen.

In the example of FIG. 1, in terms of resources of the data processing type, the platform 16 comprises a multicore processor 26 having several distinct cores. In terms of resources of the mass memory type, the platform 16 comprises a mass memory 27, in terms of resources of the input/output type, the platform 16 comprises a peripheral 28.

Figure 4:
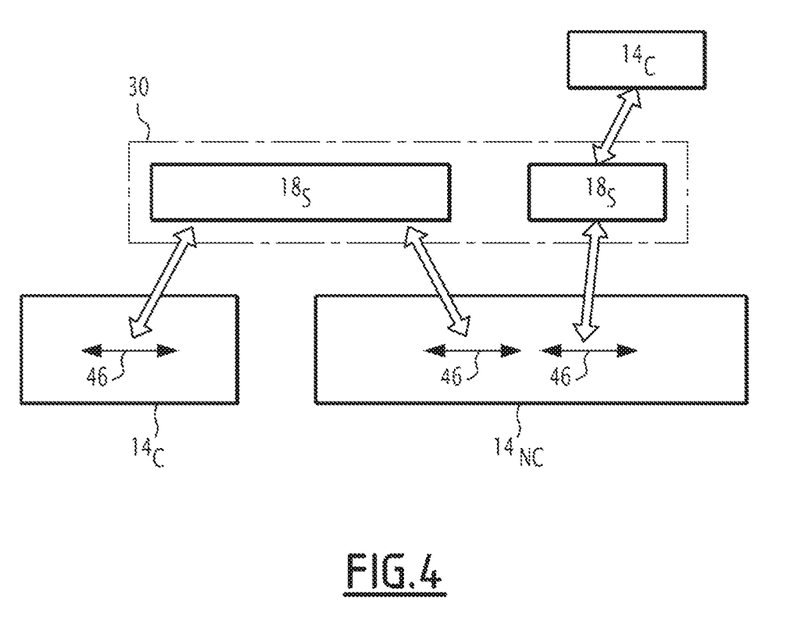
FIG. 4 is a diagram illustrating a resource shared between a non-critical software application and two critical software applications.

For each non-critical software application $14_{NC}$, a set 30 of resources 18 is determined that are shared between said non-critical software application $14_{NC}$ and at least one critical software application $14_C$ during the execution of said non-critical software application $14_{NC}$. The resource(s) 18 that are shared between said non-critical software application $14_{NC}$ and at least one critical software application $14_C$ are then called shared resource(s) and denoted $18_S$, as shown in FIG. 4.

One skilled in the art will then understand that reference 18 designates a resource in general, whether or not it involves a shared resource, and that reference $18_S$ designates a shared resource specifically.

The determination of the set 30 of shared resource(s) $18_S$ for each non-critical software application $14_{NC}$ is for example done through a static analysis of the design of the software applications 14 able to be executed on the platform 16.

Each shared resource $18_S$ is for example chosen from among the group consisting of: a core of a processor 26 of the platform, a zone of the memory 27, also called memory zone, of the platform hosting a software object shared by several execution threads, and at least one part of a peripheral 28 of the platform 16.

The memory zone of the platform hosting a software object shared by several execution queues is for example a queue in which the first elements to enter are also the first to exit, also called FIFO (First In First Out), a shared zone, a state of the object, a global variable, etc.

The at least one part of the peripheral 28 is for example one or several cache memories, a USB port, a serial port, a video card, a network card, etc.

The operating system 20 is for example an operating system according to the ARINC 653 standard, or a POSIX operating system, or a hypervisor, or middleware.

One skilled in the art will then understand that the operating system 20 is to be understood broadly, and is more generally a set of at least one system software program, designed to offer services of different types to each application 14.

The electronic monitoring device 24 is, as shown in crosshatched form in FIG. 1, preferably able to be executed directly by the platform 16. The monitoring device 24 is then for example preferably in the form of a monitoring function integrated into the operating system 20.

In a variant, also shown in FIG. 1, the electronic monitoring device 24 is separate from the platform 16, and comprises an information processing unit 34 for example made up of a processor 36 associated with a memory 38.

The electronic monitoring device 24 comprises a monitoring module 40 configured to monitor each access request sent by a respective non-critical software application $14_{NC}$ in order to access a respective set 30 of shared resource(s) $18_S$ between said non-critical software application $14_{NC}$ and at least one critical software application $14_C$.

The electronic monitoring device 24 comprises a hold module 42 configured to put the access request sent by the non-critical software application $14_{NC}$ on hold if said request is sent during a buffer time period 44 preceding the execution of the next critical software application $14_C$ including a reserved section 46 for said set 30 of shared resource(s) $18_S$. The reserved section 46, also called critical section, is a time period during which a respective software application 14, such as the next critical software application $14_C$, requests exclusive access to at least one of the resources $18_S$ of said set 30 of shared resource(s).

As an optional addition, the electronic monitoring device 24 comprises a sending module 48 configured to send the non-critical software application $14_{NC}$ a signal informing it that its access request has, if applicable, been placed on hold by the hold module 42.

In the example of FIG. 1, whether the monitoring device 24 is separate from the platform 16 or hosted and executed by the platform 16, the monitoring module 40, the hold module 42, and as an optional addition the sending module 48, are each made in the form of software, or a software component, executable by a processor, such as the processor 32 when the monitoring device 24 is separate from the platform 16. The memory 34 of the monitoring device 24 is then able to store monitoring software configured to monitor each access request sent by a respective non-critical software application $14_{NC}$ in order to access a respective set 30 of shared resource(s) $18_S$ between said non-critical software application $14_{NC}$ and at least one critical software application $14_C$, hold software configured to place the request sent by the non-critical software application $14_{NC}$ on hold if said request is sent during the buffer time period 44 preceding the execution of the next critical software application $14_C$ including a respective reserved section 46 for said set 30 of shared resource(s) $18_S$. As an optional addition, the memory 34 of the monitoring device 24 is then able to store comprises sending software configured to send the corresponding non-critical software application $14_{NC}$ a signal informing it that its access request has, if applicable, been placed on hold by the hold software. The processor 32 of the monitoring device 24 is then able to execute the monitoring software and the hold software, as well as, as an optional addition, the sending software.

In a variant that is not shown, the monitoring module 40 and the hold module 42, and, as an optional addition, the sending module 48, are each made in the form of a programmable logic component, such as an FPGA (Field Programmable Gate Array), or in the form of a dedicated integrated circuit, such as an ASIC (Application Specific Integrated Circuit).

When the monitoring device 24 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The monitoring module 40 is configured to monitor each access request sent by a respective non-critical software application $14_{NC}$ in order to access the set 30 of shared resource(s) $18_S$. The monitoring module 40 is in particular configured to monitor each lock acquisition in order to obtain a respective reserved section 46 for said set 30 of shared resource(s) $18_S$, that is to say, configured to monitor each lock acquisition sent by the non-critical software application $14_{NC}$ requesting exclusive access to at least one of the resources $18_S$ of said set 30 of shared resource(s).

Each lock acquisition sent by the respective non-critical software application $14_{NC}$ is for example sent to the operating system 20, and the monitoring module 40 is then configured to interact with the operating system 20 in order to monitor the set of lock acquisitions sent by the non-critical software applications $14_{NC}$.

The hold module 42 is configured to put the access request sent by the non-critical software application $14_{NC}$ on hold if said request is sent during the buffer time period 44 preceding the execution of the next critical software application $14_C$ including a corresponding reserved section 46 for said set 30 of shared resource(s).

The hold module 42 is then for example configured in order, at each beginning of a reserved section by the respective non-critical software application $14_{NC}$, to verify whether a respective buffer time period 44 associated with the set 30 of shared resource(s) corresponding to said reserved section 46 has already begun, and if applicable, to cancel this lock of the reserved section 46 done by the non-critical software application $14_{NC}$, and then to place the access request sent by the non-critical software application $14_{NC}$ for said set 30 of shared resource(s) on hold. In other words, the buffer time period 44 preceding the execution of the next critical software application $14_C$ including a reserved section 46 for said set 30 of shared resource(s) defines a prohibited zone 50 during which the non-critical software application $14_{NC}$ cannot retain the lock for said set 30 of shared resource(s), and then cannot access said set 30 of shared resource(s). The exclusive access by the non-critical software application $14_{NC}$ to said set 30 of shared resource(s) is then postponed to the end of this prohibited zone 50.

The hold module 42 is preferably further configured to calculate the duration of the buffer time period 44 for each set 30 of shared resource(s) determined beforehand and monitored by the monitoring device 24 according to the invention.

For each set 30 of shared resource(s), the duration of the buffer time period 44 for example depends on a worst-case execution time (WCET) of each reserved section 46 for said set 30 of shared resource(s).

For each set 30 of shared resource(s), the duration of the buffer time period 44 is preferably equal to the worst case execution time of maximum duration among the worst case execution time(s) of the reserved section(s) 46 for said set 30 of shared resource(s).

Each worst case execution time WCET is preferably calculated during a prior static analysis.

In a variant, the duration of the buffer time period 44 for each set 30 of shared resource(s) is calculated during a prior static analysis, and is not calculated by the hold module 42.

TABLE 1

|  | Critical section | WCET | Buffer period duration |
|---|---|---|---|
| Resource 1 | Critical section 1.1 | 150 ns | 400 ns |
|  | Critical section 1.2 | 400 ns |  |
|  | Critical section 1.3 | 10 ns |  |
|  | Critical section 1.4 | 60 ns |  |
| Resource 2 | Critical section 2.1 | 20 ns | 80 ns |
|  | Critical section 2.2 | 80 ns |  |

Table 1 above illustrates the calculation of the duration of the buffer time period 44 according to this preference, with two sets 30 of shared resource(s), each including a single shared resource $18_S$. For the first set 30 with the shared resource $18_S$ called "Resource 1", the worst-case execution time WCET of maximum duration is 400 ns and corresponds to the reserved, or critical, section 1.2, such that the duration of the buffer time period 44 for the first set 30 is 400 ns. Similarly, for the second set 30 with the shared resource $18_S$ called "Resource 2", the worst-case execution time WCET of maximum duration is that with critical section 2.2 and is equal to 80 ns, and the duration of the buffer time period 44 for this second set 30 is then equal to 80 ns.

Additionally, at least one set 30 of shared resource(s) includes a plurality of shared resources $18_S$, and the duration of the buffer time period 44 for the corresponding set 30 is then determined for said plurality of shared resources $18_S$.

According to this addition, in the preferred case where the duration of the buffer time period 44 is equal to the worst case execution time WCET of maximum duration among the worst case execution time(s) WCET of the reserved section(s) 46 for said set 30 of shared resource(s), the maximum duration taken into account is then that for the set of reserved sections 46 for the plurality of shared resources $18_S$.

Thus, in the example of table 1 above, assuming according to this addition that table 1 corresponds to a single set 30 of several shared resources, formed by resources called "Resource 1" and "Resource 2", and the worst-case execution time WCET of maximum duration among the six reserved sections 46 for the two shared resources $18_S$ is that corresponding to the critical section 1.2 and is equal to 400 ns, such that the duration of the buffer time period 44 for this set 30 of two shared resources is then, for example according to the aforementioned preferred calculation, equal to 400 ns.

As an optional addition, the hold module 42 is further configured to put the access request sent by the non-critical software application $14_{NC}$ on hold if this request is sent during the execution of the next critical software application $14_C$ including the reserved section 46 for said set 30 of shared resource(s).

Figure 5:
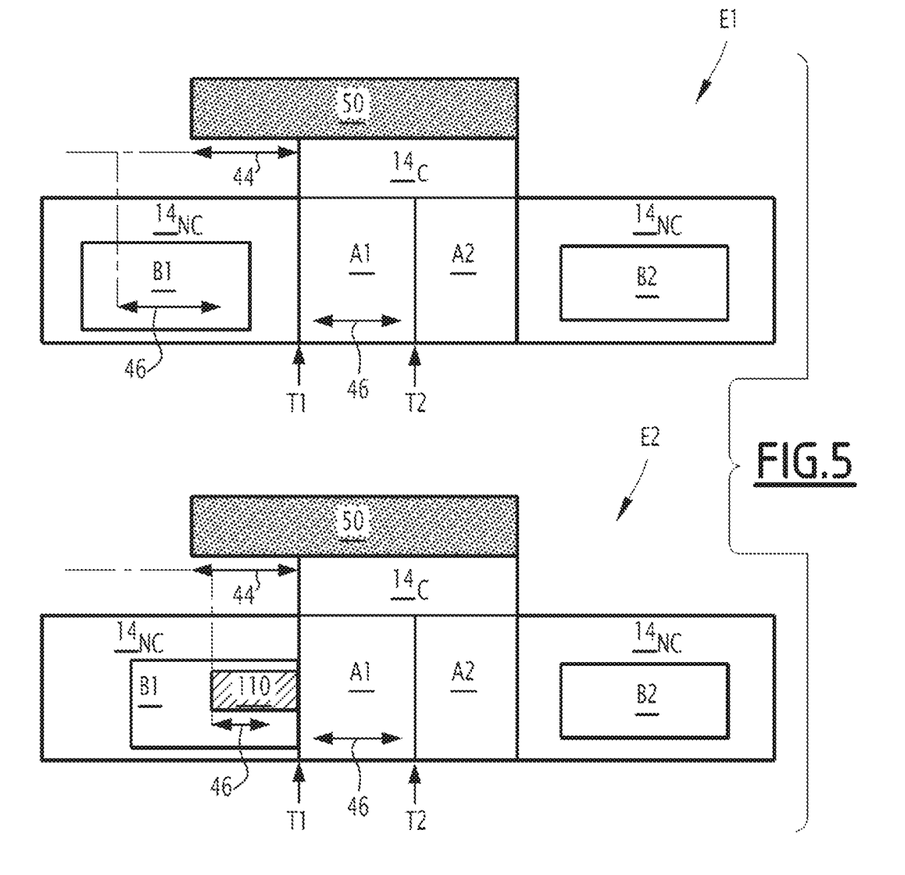
FIG. 5 is a view illustrating an implementation of the monitoring according to the invention, in the case where the critical software application is a switching function between two non-critical software applications, with a first example where the request is sent before a buffer time period preceding the execution of said critical software application and is then not put on hold, and a second example where the request is sent during said buffer time period and then is put on hold.
Figure 6:
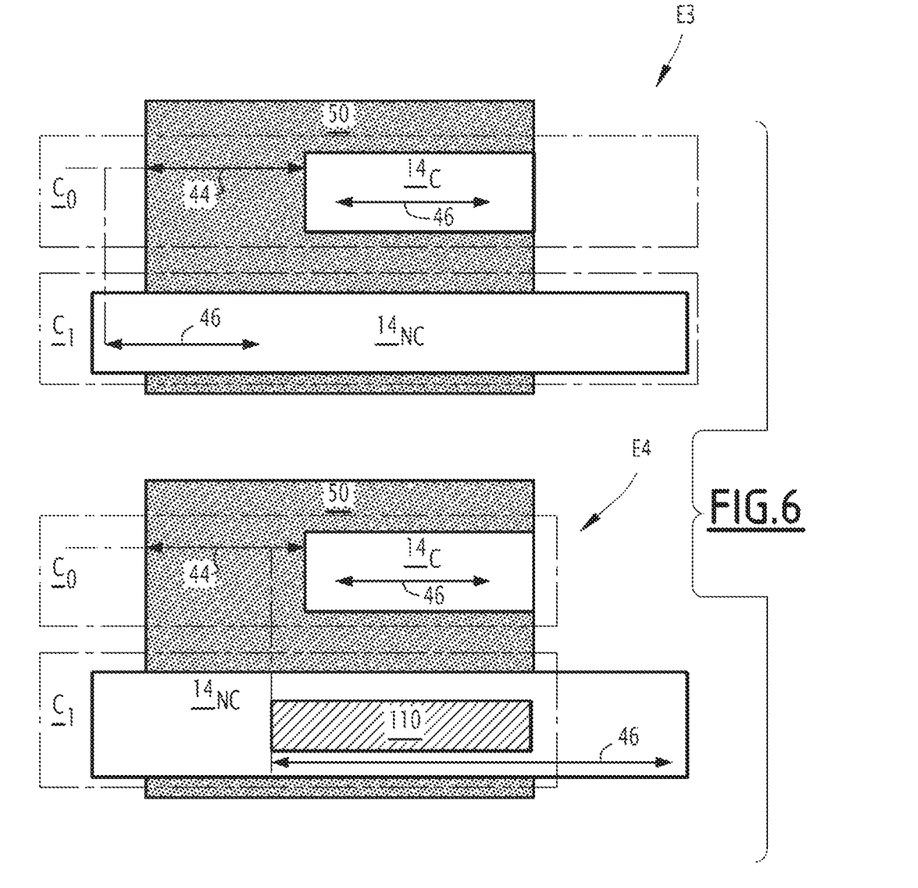
FIG. 6 is a view similar to that of FIG. 5 for implementation of the monitoring according to the invention, in the case where the non-critical software application is intended to be executed by a core of a multicore processor of the platform and the critical software application is suitable for being executed by another core of said processor.

According to this optional addition, the prohibited zone 50 resulting from this placement on hold then corresponds to the time period including the buffer time period 44 preceding the execution of the next critical software application $14_C$ as well as the execution itself of this next critical software application $14_C$, as shown in the examples of FIGS. 5 and 6.

In other words, the duration of the prohibited zone 50 is either equal to only the duration of the buffer time period 44, or to the sum of the durations of the buffer time period 44 and the execution of the next critical software application $14_C$.

One skilled in the art will understand that aside from this duration, the prohibited zone 50 is defined by a beginning and a step, the beginning corresponding to the beginning of the buffer time period 44, that is to say, corresponding to the moment in time of the beginning of execution of the next critical software application $14_C$ from which the duration of the buffer period 44 is subtracted, and the step corresponding to the set 30 of shared resource(s) associated with this buffer time period 44 and this prohibited zone 50.

The sending module 48 is configured to send the non-critical software application $14_{NC}$ a signal informing it that its access request has been placed on hold by the hold module 42. The reception of this signal then allows the concerned non-critical software application $14_{NC}$ to assess the impact on its operation of this placement on hold, and in particular to see whether this placement on hold is provided in these operating margins, such that the hold signal can be recorded, then ignored; or whether this placement on hold will cause an abnormal behavior of the non-critical software application $14_{NC}$, in which case said non-critical software application $14_{NC}$ will for example generate an associated error message.

Figure 2:
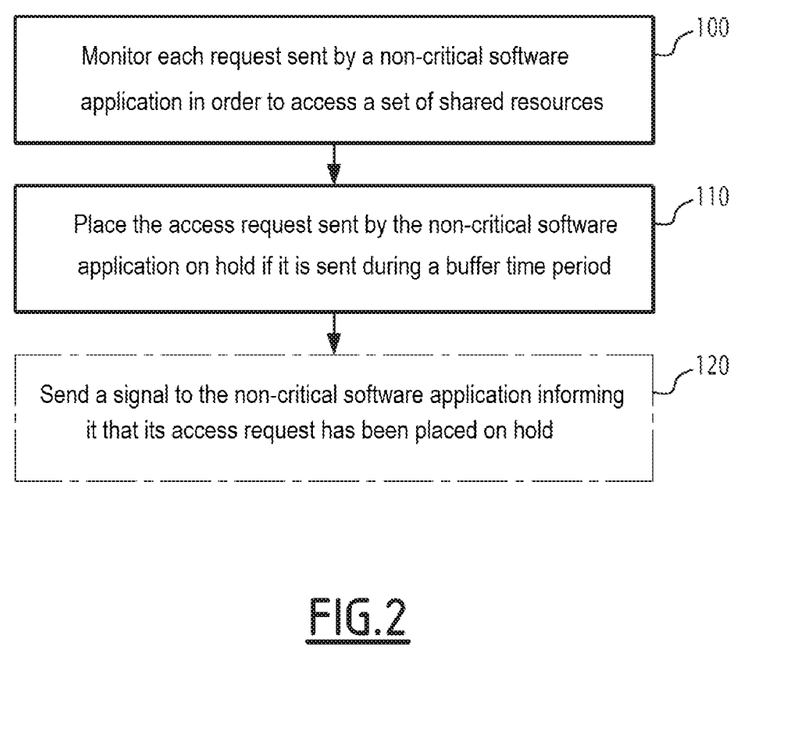
FIG. 2 is a schematic flowchart of a method for monitoring at least one software application able to be executed on the platform, the method being carried out by the monitoring device of FIG. 1.
Figure 3:
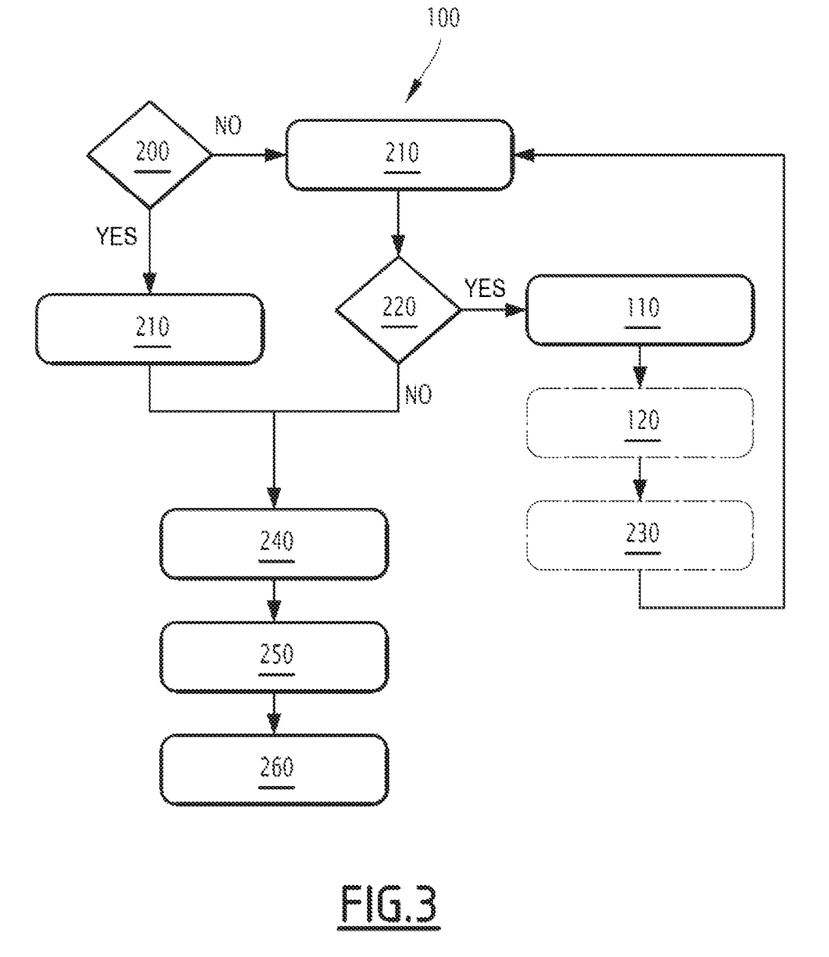
FIG. 3 is a flowchart of an exemplary implementation of the monitoring method of FIG. 2.

The operation of the monitoring device 24 according to the invention will now be explained using FIG. 2, showing a schematic flowchart of the method, according to the invention, for monitoring at least one software application 14, the method being implemented by the electronic monitoring device 24, as well as using FIG. 3 showing a flowchart of an exemplary implementation of the monitoring method, with use of a lock mechanism.

During a step 100, the monitoring device 24 monitors, via its monitoring module 40, each access request sent by a respective non-critical software application $14_{NC}$ in order to access a respective set 30 of shared resource(s) between said non-critical software application $14_{NC}$ and at least one critical software application $14_C$.

The monitoring device 24 next verifies, during step 110, whether the sent request was sent during a respective buffer time period 44 preceding the execution of the next critical software application $14_C$ including a respective reserved section 46 for said set 30 of shared resource(s), and then places said sent access request on hold if applicable. However, if the access request was sent by the non-critical software application $14_{NC}$ outside said buffer time period 44, in particular before said buffer time period 44, then the hold module 42 does not place said access request on hold and the non-critical software application $14_{NC}$ then accesses the set 30 of shared resource(s) without hold.

As an optional addition and if the request sent by the non-critical software application $14_{NC}$ has been previously placed on hold during step 110, then the monitoring device 24 sends, via its sending module 48, a signal corresponding to the non-critical software application $14_{NC}$ to inform it that its access request has been placed on hold during the previous step 110.

The monitoring device 24 next returns to step 100 in order to monitor the next request sent by a non-critical software application $14_{NC}$.

FIG. 3 illustrates an implementation of the monitoring method according to the invention in the case where a lock mechanism is used, via the operating system 20, to be able to reserve a critical section 46 for a respective set 30 of shared resource(s).

In FIG. 3, during an initial step 200, the monitoring device 24 determines, via its monitoring module 40, whether the software application 14 wishing to reserve a critical section 46 for said set 30 of shared resource(s) is a critical software application $14_C$ or a non-critical software application $14_{NC}$.

If the software application 14 wishing to reserve the critical section 46 is a non-critical software application $14_{NC}$, then the monitoring device 24 next performs—via the operating system 20—a locking of the resource(s) of said set 30 of shared resource(s) corresponding to said critical section 46 for the exclusive access by said software application 14, then passes directly to a following step 220 during which the monitoring device 24 determines, via its hold module 42, whether a prohibited zone 50 is in progress for said critical section 46, that is to say, determines whether the request sent by the non-critical software application $14_{NC}$ was sent during a buffer time period 44 preceding the execution of the next critical software application $14_C$ including said reserved section 46 for said set 30 of shared resource(s) or as an optional addition during the execution of said next critical software application $14_C$.

At the end of this test step 220, if the hold module 42 determines that the access request was sent by the non-critical software application $14_{NC}$ during a prohibited zone 50, that is to say, during said buffer time period 44 or as an optional addition during the execution of the next critical software application $14_C$ including said critical selection 46, then the monitoring device 24 next performs the hold step 110 previously described, then optionally the step 120 for sending the information signal to the non-critical software application $14_{NC}$, before observing a hold period during step 230, for example via the triggering of a time delay, before returning to step 210, then next step 220 in order to see whether the prohibited zone 50 is still in progress following this hold.

In this example, the hold step 110 then corresponds to a cancellation of the locking of the critical section 46 previously done during step 210, that is to say a lock release via the operating system 20.

At the end of the test step 220, if on the contrary, the hold module 42 has determined that the request was sent outside a prohibited zone 50, that is to say, it was not sent during a respective buffer time period 44, and as an optional addition not during the execution of said next critical software application $14_C$, then the monitoring device 24 passes to the next step 240 in order to record this reserved section 46, in particular an identifier of the software application 14 having obtained exclusive access to this reserved section 46.

Further to step 240, step 250 is next carried out and corresponds to the execution as such of the reserved section 46, that is to say, the exclusive access by said software application 14 to the concerned resource(s) 18 of said set 30 of shared resource(s).

Lastly, during step 260, at the end of the execution of the reserved section 46, the reserved section 46 is released by the corresponding software application 14, by releasing—via the operating system 20—the lock for the concerned resource(s), and said software application 14 then no longer has access to this or these resources $18_S$.

At the end of the initial step 200, if the monitoring device 24 on the contrary determines that the software application 14 requesting the access is a critical software application $14_C$, then the monitoring device 24 also locks the reserved section 46 during step 210 via the operating system 20, then goes directly to step 240, and next to steps 250 and 260, previously described, without performing the test step 220.

In other words, if the monitoring device 24 determines that the access request for the resource(s) corresponding to the critical section 46 has been sent by a critical software application $14_C$, then the monitoring device 24 will not put this access request on hold.

In other words, the hold done by the hold module 42 if the request is sent during a respective buffer time period 44 only relates to a corresponding non-critical software application $14_{NC}$, and does not relate to a critical software application $14_C$.

FIG. 5 illustrates a first implementation of the monitoring according to the invention when the non-critical software application(s) $14_{NC}$ and the critical software application(s) $14_C$ are able to be executed on a same processor core, for example when the critical software application $14_C$ is a switching function between two successive non-critical software applications $14_{NC}$.

In FIG. 5, a first example E1 is then an example where a first non-critical software application $14_{NC}$ including processing B1 requests exclusive access to at least one of the resources 18 of the respective set 30 of resources shared with the critical software application $14_C$, before the beginning of the buffer time period 44 preceding the execution of the critical software application $14_C$ including the reserved section 46 during a first A1 of its two processing operations A1, A2.

In this first example E1, since the access request sent by the non-critical software application $14_{NC}$ was sent before the buffer time period 44, or outside the prohibited zone 50, then it is not put on hold, and the processing B1 of this non-critical software application $14_{NC}$ can then exclusively access the resource(s) associated with the reserved section 46, and this reserved section 46 is then next released, due to the taking into account of the buffer time period 44, before the next critical software application $14_C$ in turn needs said reserved section 46 during the execution of its first processing operation A1.

In this first implementation, the first processing operation A1 of the switching function corresponds to a break of all of the activities in progress, then saving of the context, then a second processing operation A2 of the switching function corresponds to a restoring of a previously saved context, so that the next non-critical software application $14_{NC}$ can be executed with the context that corresponds to it.

According to this first example E1, the next critical software application $14_C$ then executes, without time shift, at a first moment in time T1, its first processing operation A1 including the critical section 46, then its second processing operation A2 at a second moment in time T2, before the core switches to the execution of the following non-critical software application $14_{NC}$ so that it can perform its processing operation B2 normally.

In FIG. 5, a second example E2 next shows another example where this time, the request sent by the processing B1 of the non-critical software application $14_{NC}$ for the reserved section 46 is sent during the buffer time period 44 preceding the execution of the next critical software application $14_C$ including the reserved section 46 (during its processing A1) for said set 30 of shared resource(s). The access request sent by the processing B1 of the non-critical software application $14_{NC}$ is then put on hold, as shown by the box 110 diagramming the hold step previously described, and the processing B1 of the non-critical software application $14_{NC}$ then cannot, at that moment, access the resource(s) of said set 30 of shared resource(s) associated with said critical section 46.

According to this second example E2, the next critical software application $14_C$ then executes normally, that is to say, without delay, or without time shift, at the same first moment in time T1, its processing operation A1 including the critical section 46, then its second processing operation A2 at the same second moment in time T2, before the core switches to the execution of the following non-critical software application $14_{NC}$ so that it can perform its processing operation B2.

One skilled in the art will then understand that, in this second example E2, the processing B1 of the non-critical software application NC could not have had access to the critical section 46 during this iteration, since this access was placed on hold. Indeed, if the non-critical software application $14_{NC}$ could have had access to this critical section 46 at this moment for its processing B1, then this exclusive access to the resource(s) associated with this critical section 46 would next potentially have caused a delay in the execution of the next critical software application $14_C$, that is to say, a time shift of the first and second moments in time T1, T2, which must be prohibited.

FIG. 6 illustrates a second implementation of the monitoring according to the invention according to which the critical software application $14_C$ is able to be executed on a first core C0 of a multicore processor of the platform 16, while the non-critical software application $14_{NC}$ is able to be executed on a second core C1 of said processor, the critical software application $14_C$ and the non-critical software application $14_{NC}$ nevertheless having at least one shared resource $18_S$ in common, such as a memory zone of the memory 27 or a part of the peripheral 28 of the platform 16, corresponding to the critical section 46 shown in FIG. 6.

In this second implementation, the third example E3 is then an example where the critical section 46 of the non-critical software application $14_{NC}$ begins before the buffer time period 44 preceding the execution of the critical software application $14_C$, and the access request sent by the non-critical software application $14_{NC}$ at the beginning of the critical section 46 in order to have exclusive access to the resource(s) $18_S$ associated with this critical section 46 is then not put on hold by the hold module 42. The non-critical software application $14_{NC}$ then has exclusive access to the resource(s) associated with said critical section 46. The non-critical software application $14_{NC}$ next releases the critical section 46 before the next critical software application $14_C$ including said reserved section 46, the fact that this critical section 46 can be released before this next execution resulting from the taking into account of the buffer time period 44.

In this second implementation, the fourth example E4 illustrates another example where the critical section 46 of the non-critical software application $14_{NC}$ this time begins during the buffer time period 44 preceding the execution of the next critical software application $14_C$ including said critical section 46. The request sent at the beginning of its critical section 46 by the non-critical software application $14_{NC}$ is then put on hold by the hold module 42, as shown schematically by the box 110 in this fourth example E4, such that the non-critical software application $14_{NC}$ does not have access to the resource(s) $18_S$ associated with this critical section 46 at that moment. This then makes it possible to reduce the risk that during the execution of the next critical software application $14_C$ including the critical section 46 for the same set 30 of shared resource(s), the exclusive access by said critical software application $14_C$ to the resource(s) $18_S$ associated with this critical section 46 will be delayed due to the non-critical software application $14_{NC}$.

One skilled in the art will further observe that, in this fourth example E4, the access request initially sent by the non-critical software application $14_{NC}$ at the beginning of its critical section 46 is put on hold until the end of the execution of the critical software application $14_C$ including said critical section 46, as shown schematically by the box 110 ending at the same time as the end of the execution of the critical software application $14_C$. At the end of this prohibited zone 50, the non-critical software application $14_{NC}$ then obtains exclusive access to the resource(s) $18_S$ associated with said section 46, as shown schematically by the arrow representing the section 46 for the non-critical software application $14_{NC}$ that continues after the end of the execution of the critical software application $14_C$ and the end of the prohibited zone 50.

One skilled in the art will then understand that if the access request sent by the non-critical software application $14_{NC}$ is sent during a corresponding buffer time period 44, then this access request is not rejected, but simply put on hold by the hold module 42, preferably until the end of execution of the critical software application $14_C$ including the critical section 46 for the same set 30 of shared resource (s).

Thus, the monitoring device 24 and the monitoring method according to the invention make it possible, due to the buffer time period 44, to prevent an access request sent by a non-critical software application $14_{NC}$ at an inopportune moment, that is to say, at a moment in time too close to the next critical software application $14_C$ including a respective reserved section 46 for the same set 30 of shared resource(s) as that for which the access request was sent by the non-critical software application $14_{NC}$, from next delaying the execution of the next critical software application $14_C$. If applicable, the monitoring device 24 according to the invention then places said access request sent by the non-critical software application $14_{NC}$ on hold in order to give priority to the execution of the next critical software application $14_C$ and to avoid a delay in the execution thereof. The non-critical software application $14_{NC}$ may then have access exclusively to the shared resource(s) $18_S$ of said set 30 at the end of the execution of this critical software application $14_C$.

This then makes it possible to offer a better operation of the platform 16, in particular of the critical software applications $14_C$ having to be executed in a given amount of time with a defined temporal allowance, while offering a good execution of all of the software applications, including non-critical software applications, since the access requests sent by the non-critical software applications $14_{NC}$ are not rejected, if applicable, but simply put on hold.

As an optional addition, the sending to the non-critical software application $14_{NC}$ of a signal informing it that its access request has been put on hold, if applicable, allows the non-critical software application $14_{NC}$ to be informed, on the one hand, of this placement on hold, and on the other hand, to be able to evaluate the impact on its operation of this placement on hold.

Also as an optional addition, the placement on hold of the access request sent by the non-critical software application $14_{NC}$ also, if it is sent during the execution of the next critical software application $14_C$ including said reserved section 46 for said set 30 of shared resource(s), makes it possible to further improve the operation of the platform 16, by also including—in the prohibited zone 50 resulting from the buffer time period 44—the time period corresponding to the execution as such of the critical software application 14$_C$.

Also as an optional addition, the calculation of the duration of the buffer time period 44 as a function of the worst case execution time WCET of each reserved section 46 for said set 30 of shared resource(s) also makes it possible to further improve the operation of the platform 16, by seeking to guarantee that irrespective of the execution time of each reserved section 46 taken into account, the duration of the buffer time period 44 will be sufficient to prevent the execution of a reserved section 46 for a set 30 of shared resource(s) by a non-critical software application 14$_{NC}$ from next delaying the execution of the next critical software application 14$_C$ including that the reserved section 46 for said set 30 of shared resource(s).

One can thus see that the monitoring method and the monitoring device 24 according to the invention make it possible to offer a better operation of the platform 16, by improving the execution of the software applications 14, in particular of the critical software applications 14$_C$ generally having to be executed in a given amount of time with a defined temporal allowance.

The invention claimed is:

1. A method for monitoring at least one software application able to be executed on a platform, the platform including resources that each software application of the at least one software application is able to access during the execution of each software application of the at least one software application, the method being implemented by an electronic monitoring device and comprising:
    monitoring each access request sent by a non-critical software application in order to access a set of resource(s) shared between the non-critical software application and at least one critical software application; and
    putting the access request sent by the non-critical software application on hold if the access request is sent during a duration of a buffer time period for the set of shared resource(s) preceding an execution of a next critical software application including a reserved section for the set of shared resource(s), wherein the reserved section for the set of shared resource(s) is a time period during which one critical software application of the at least one critical software application requests exclusive access to at least one shared resource of the set of shared resource(s), and wherein the duration of the buffer time period depends on a worst-case execution time of each reserved section for the set of shared resource(s).

2. The method according to claim 1, wherein the access request sent by the non-critical software application is further put on hold if the access request is sent during the execution of the next critical software application including the reserved section for the set of shared resource(s).

3. The method according to claim 1, wherein the duration of the buffer time period is equal to a worst case execution time of maximum duration among worst case execution time(s) of the reserved section(s) for the set of shared resource(s).

4. The method according to claim 3, wherein each worst case execution time of each reserved section for the set of shared resource(s) is calculated during a prior static analysis.

5. The method according to claim 1, wherein the set of shared resource(s) includes a plurality of shared resources, and wherein the duration of the buffer time period is determined for the plurality of shared resources.

6. The method according to claim 1, wherein each shared resource of the set of shared resource(s) is selected from the group consisting of: a core of a processor of the platform, a memory zone of the platform hosting a software object shared by execution threads, and a part of a peripheral of the platform.

7. The method according to claim 1, wherein the method further comprises sending a signal to the non-critical software application informing the non-critical software application that the access request has been put on hold.

8. The method according to claim 1, wherein each critical software application of the at least one critical software application has a criticality level corresponding to a DAL level defined according to standard DO-178 revision B and following revision(s), or according to standard ARP4754.

9. The method according to claim 8, wherein the criticality level corresponding to the DAL level is equal to level DAL A or level DAL B.

10. The method according to claim 9, wherein the levels DAL A and DAL B are considered the most critical levels.

11. The method according to claim 1, wherein each software application of the at least one software application is an avionics software application, and wherein the platform is intended to be embedded in an aircraft.

12. A non-transitory computer-readable medium storing a computer program comprising software instructions which, when executed by a computer, perform a method according to claim 1.

13. An electronic monitoring device for monitoring at least one software application able to be executed on a platform, the platform including resources that each software application of the at least one software application is able to access during the execution of each software application of the at least one software application, the electronic monitoring device comprising:
    a processor; and
    a memory to store modules to be executed by the processor, wherein the modules comprise:
    a monitoring module configured to monitor each access request sent by a non-critical software application in order to access a set of resource(s) shared between the non-critical software application and at least one critical software application; and
    a hold module configured to put the access request sent by the non-critical software application on hold if the access request is sent during a duration of a buffer time period for the set of shared resource(s) preceding an execution of a next critical software application including a reserved section for the set of shared resource(s), wherein the reserved section for the set of shared resource(s) is a time period during which one critical software application of the at least one critical software application requests exclusive access to at least one shared resource of the set of shared resource(s), and wherein the duration of the buffer time period depends on a worst-case execution time of each reserved section for the set of shared resource(s).

14. An electronic avionics system, comprising:
    a memory to store at least one avionics software application;
    a platform to execute each avionics software application of the at least one avionics software application, wherein the platform includes resources that each avionics software application of the at least one avionics software application is to access during the execution of each avionics software application of the at least one avionics software application; and
    an electronic monitoring device to monitor each avionics software application of the at least one avionics software application, wherein the electronic monitoring device is configured according to claim 13.

* * * * *